Oct. 20, 1925.

H. F. JOSEPH

AUTOMATIC ADJUSTER FOR WRIST PIN BEARINGS FOR AUTOMOBILE AND GAS ENGINES

Filed Dec. 8, 1922

1,558,444

Harry F Joseph _____ INVENTOR.

BY

Walter Allen _____ ATTORNEY.

Patented Oct. 20, 1925.

1,558,444

UNITED STATES PATENT OFFICE.

HARRY F. JOSEPH, OF DAVENPORT, IOWA, ASSIGNOR OF ONE-HALF TO A. G. BUSH, OF DAVENPORT, IOWA.

AUTOMATIC ADJUSTER FOR WRIST-PIN BEARINGS FOR AUTOMOBILE AND GAS ENGINES.

Application filed December 8, 1922. Serial No. 605,595.

*To all whom it may concern:*

Be it known that HARRY F. JOSEPH, a citizen of the United States of America, residing at Davenport, in the county of Scott and State of Iowa, has invented certain new and useful Improvements in Automatic Adjusters for Wrist-Pin Bearings for Automobile and Gas Engines, of which the following is a specification.

My invention relates to improvements in automatic adjusters for wrist pin bearings for automobiles and gas engines generally, but is applicable to many other uses.

The objects of my invention are:

First, to provide a simple adjuster for bearings, especially wrist pin bearings, for automobile and gas engines generally and various other forms of machinery where an automatic takeup is desirable.

Second, to provide such a bearing which can readily be applied and which will automatically take up the slack caused by wear in the bearings.

My invention is applicable to types of bearings where the wrist pin is rigidly secured to the piston and the connecting rod turns upon it as well as to those types where the wrist pin is rigidly secured to the connecting rod and the piston or other movable part turns upon the wrist pin or the wrist pin turns within such movable part.

I attain the foregoing objects by the mechanism illustrated in the accompanying drawings, in which,—

Figure 1:
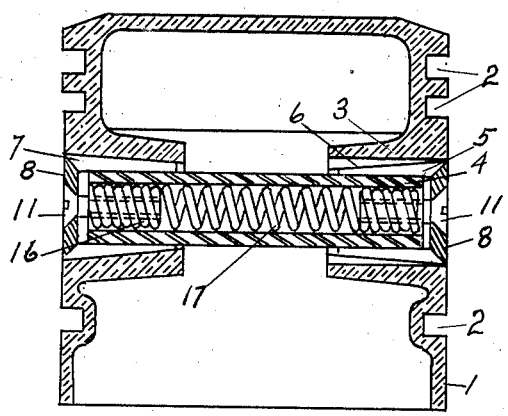
Figure 3:
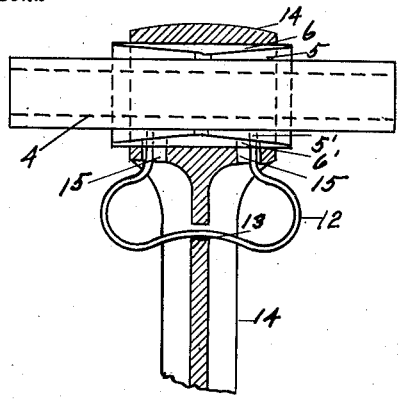
Figure 2:
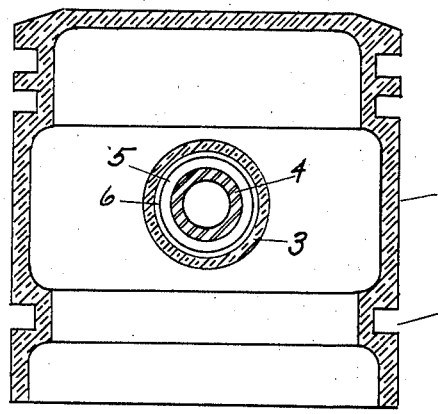
Figure 9:
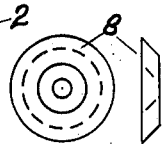
Figure 4:
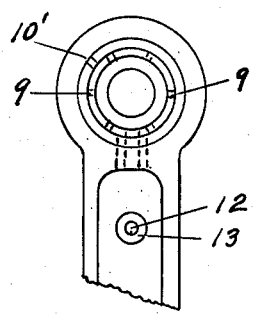
Figure 5:
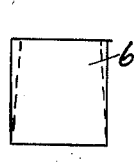
Figure 6:
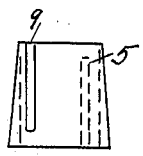
Figure 7:
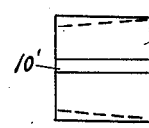
Figure 8:
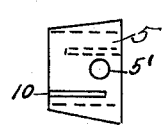
Figure 10:
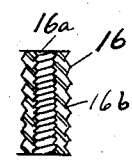

Figure 1 is a vertical section of a piston with wrist pin inserted therein, on the longitudinal axis of the wrist pin, and showing the preferred form of my invention; Fig. 2 is a vertical section of a piston showing a cross section view of the wrist pin and bearings; Fig. 3 is a section of the upper portion of a connecting rod with the wrist pin inserted therein on the longitudinal axis of the wrist pin and showing an alternative form of spring; Fig. 4 is a vertical cross section of a wrist pin and bearing inserted in a connecting rod; Fig. 5 is a detail view of an outer bushing; Fig. 6 is a detail view of an inner bushing showing the slots which permit it to bend to adapt itself to the size and shape of the outer bushing; Fig. 7 is a side view of an outer bushing for connecting rod; Fig. 8 is a detail of the inner bushing for connecting rod; Fig. 9 shows details of the retainer plate, and Figure 10 is a detail of the spring adjuster of my preferred form.

Similar numerals refer to similar parts throughout the several views.

My device comprises tapered bushings actuated by a spring and may consist of a single pair of tapered bushings, 7, as shown at the left of Figure 1, with the opening in the hub of the piston reamed out by a tapered reamer to correspond to the taper of the bushing or the opening in the hub of the piston may be left straight as at the right side of Figure 1 and an internally tapered bushing, 6, inserted therein with an externally tapered bushing, 5, inserted inside of the outer bushing. The tapers of the inner bushing, 5, and the outer bushing, 6, correspond in length and slope.

When the adjustable bushings are fitted in the piston, the usual opening is provided in the hub, 3, of the piston.

In Figure 1 I have shown a tapered opening on the left side and a straight opening on the right side. When a single tapered bushing is used, the opening in the piston hub is tapered as on the left side of Figure 1. When a pair of bushings is used, the opening in the piston is straight as shown on the right side of Figure 1.

A hollow wrist pin, 4, is used. When a single bushing, 7, is used, it is tapered as shown on the left of Figure 1 and has its outer end beveled on the inside to fit a cap or plate, 8. The cap, 8, has a central hole to admit a machine screw, 11, which is reamed out to form a seat for the head of the screw.

It will be understood, of course, that when one hub of the piston is tapered, the opposite hub will also be correspondingly tapered and when a single bushing is used in one hub, a single bushing is intended to be used in the other also. In the drawings, to save a multiplicity of drawings, I have shown both forms. When my device is applied to a piston at the factory where the pistons are made, I prefer to use a single bushing, but owing to the difficulty of reaming out the piston hubs to the proper taper at the ordinary garage or repair shop, I prefer to use a double bushing for most repair and replacement purposes.

When a double bushing is used, the outer bushing, 6, is preferably formed of steel and of a size to make a close press fit with the hub. The outer bushing may be slotted its full length as at 10' in Figure 7. The outer bushing forms the necessary taper. The inner bushing, 5, is tapered to correspond to the taper of the outer bushing and is preferably a little shorter than the outer bushing so as to allow a little room for adjustment.

The inner bushing, 5, has its outer end beveled to form a seat for the cap, 8.

The outer faces of the caps, 8, are preferably curved to correspond to the curve of the circumference of the piston.

In the preferred form of my invention, plugs or blocks, 16, are inserted in each end of a spiral tension spring, 17. The circumference of each plug, 16, is provided with a groove into which the adjacent portion of the spring, 17, closely fits so as to form a secure connection between the plug and the spring. The inside of each plug is bored and threaded to correspond to the machine screw, 11. The spring is of such length that it reaches the desired degree of tension when the machine screws are screwed into the plugs to nearly their full length and the tension upon the spring, 17, is increased by screwing the machine screws, 11, into their corresponding plugs and relaxed by screwing them outwardly.

When it is desired to apply these adjustable bushings to the head of the connecting rod so that the wrist pin will turn in the connecting rod instead of in the piston, outer tapered bushings, 6, are secured in the head with their thickest portions at the middle of the head and adjustable bushings, 5, are mounted inside thereof. The outer bushings are preferably of steel and the inner bushings are preferably of a suitable alloy of brass or other bearing metal.

The inner bushings are provided with a plurality of slots as shown in Figures 6 and 8. I prefer to have five or six slots in each inner bushing. One of the slots extends the full length of the bushing and the others extend nearly the full length, a part of them starting from one end of the bushing and a part from the other end so as to allow a fair degree of movement of the bushing in adapting itself to any irregularities of shape of either the wrist pin or outer bushing and to facilitate the inward movement of the bushing by the force of the spring.

In Figure 3, a tension spring, 12, is seated in a hole, 13, drilled through the web of the connecting rod and the upper ends of the spring pass through holes, 15, in the under side of the head of the connecting rod and through holes, 6', in the outer bushing and are seated in small holes, 5', in the inner bushings. The holes, 5', correspond in size to the circumference of the spring wire, 12, and the holes, 6' and 15, are made large enough to allow the necessary movement of the spring to draw the inner bushings toward each other.

The same form of spring shown in Figure 3 may be applied to bushings seated in the hubs of a piston and in such cases, holes as at 15, would be bored through the under side of the hubs, 3, and holes, 5' and 6', would be formed in the inner and outer bushings, 5 and 6, respectively or in the case of a single bushing, a hole corresponding to 5' would be bored in the lower side of the bushing, 7.

I do not limit my invention to any specific form of spring, for it is obvious that the essential feature of my invention is the compressible tapered bushing and any form of spring or other means which will effect pressure upon the tapered bushing tending to tighten it, will accomplish the objects of my invention.

It is likewise obvious that the same effect may be produced by tapering the outer ends of the wrist pin outwardly so that the tapered bushings as they are drawn toward the middle of the wrist pin, will tighten the bearing.

As a practical matter, it is much easier to taper the bearings in the hubs than it is to manufacture the wrist pins tapered at each end and I therefore prefer to taper the bearings rather than to taper the wrist pins.

While my invention is particularly applicable to gas engines, it is obvious that it is also applicable to a wide variety of other mechanical uses and I do not limit it to any particular class of machinery.

My invention lends itself to very large variations in size and proportions and the spring tension may be varied to any desired degree.

It is also obvious that oil grooves or any other well known forms of oiling may be applied to my device and that the slots, 9 and 10, will facilitate the distribution of oil to a considerable extent.

I claim:

1. In a bearing, a hollow shaft or pin, a tapered bushing adjustably mounted thereon and having its outer end internally beveled, a bearing member surrounding the tapered bushing, a cap mounted upon the beveled end of the bushing and means secured within the hollow shaft and connected with the cap for applying pressure upon the outer end of the bushing.

2. In a bearing, a hollow shaft or pin, a pair of tapered bushings adjustably mounted thereon and having their outer ends internally beveled, bearing members surrounding the tapered bushings, caps mounted upon the beveled ends of the bushings and means secured within the hollow shaft and connected with the caps for applying pressure upon the outer ends of the bushings.

3. In a bearing, the combination with bearing members, of a hollow shaft or pin mounted therein, tapered bushings mounted upon the shaft within the bearing members, a coiled tension spring mounted within the hollow shaft and means for applying the tension of the spring to the tapered bushings.

4. In a bearing, the combination with bearing members, of a hollow shaft or pin mounted therein, tapered bushings mounted upon the shaft within the bearing members, a coiled tension spring mounted within the hollow shaft, caps secured at the ends of the hollow shaft and bearing against the outer ends of the tapered bushings, plugs secured in the ends of the tension spring and means for adjustably securing the plugs to the caps.

5. In a bearing, the combination with bearing members, of a hollow shaft or pin mounted therein, tapered bushings mounted upon the shaft within the bearing members, a coiled tension spring mounted within the hollow shaft, caps secured at the ends of the hollow shaft and bearing against the outer ends of the tapered bushings, plugs secured in the ends of the tension spring and machine screws having a head seated in the caps and adapted to screw into the plugs.

6. In a wrist pin bearing, a hollow shaft, a tapered bushing adjustably mounted thereon, such bushing being provided with a plurality of longitudinal slots extending approximately three-quarters of the length of said bushing, a bearing member surrounding the tapered bushing, a cap mounted upon the outer end of the bushing and means secured within the hollow shaft and connected with the cap for applying pressure upon the outer end of the bushing.

7. In a bearing, the combination with suitable bearing members, of a hollow shaft mounted therein, a pair of tapered bushings mounted upon the shaft, each of said bushings being provided with a plurality of longitudinal slots extending less than the entire length thereof, and means secured to the hollow shaft for driving the tapered bushings against correspondingly tapered seats in the bushings.

In testimony whereof he affixes his signature.

HARRY F. JOSEPH.